United States Patent
Beringer

(10) Patent No.: US 6,672,437 B2
(45) Date of Patent: Jan. 6, 2004

(54) MOTOR VEHICLE BRAKING DEVICE

(75) Inventor: Gilbert Beringer, Chatelneuf (FR)

(73) Assignee: SA Beringer, Chatelneuf (FR)

(*) Notice: Subject to any disclaimer, the term of this patent is extended or adjusted under 35 U.S.C. 154(b) by 0 days.

(21) Appl. No.: 10/327,562

(22) Filed: Dec. 20, 2002

(65) Prior Publication Data
US 2003/0141158 A1 Jul. 31, 2003

Related U.S. Application Data

(63) Continuation of application No. PCT/FR01/01966, filed on Jun. 22, 2001.

(51) Int. Cl.⁷ .................... B60T 11/00; B60T 13/00
(52) U.S. Cl. .................... 188/349; 303/9.64; 303/9.62; 303/9.69
(58) Field of Search ................... 188/344, 349; 303/9.62, 9.64, 9.67, 9.68, 9.69, 22.1, 186, DIG. 6

(56) References Cited

U.S. PATENT DOCUMENTS

| | | | | |
|---|---|---|---|---|
| 5,257,856 A | * | 11/1993 | Ota et al. ................... | 188/344 |
| 5,324,102 A | * | 6/1994 | Roll et al. ................. | 303/9.64 |
| 6,238,017 B1 | * | 5/2001 | Eitel ........................... | 188/344 |
| 6,378,957 B1 | * | 4/2002 | Vagstedt ..................... | 303/9.62 |
| 6,428,118 B1 | * | 8/2002 | Blosch ....................... | 303/9.64 |

FOREIGN PATENT DOCUMENTS

| | | |
|---|---|---|
| DE | 32 13 281 A | 10/1983 |
| DE | 33 29 140 A | 2/1985 |
| DE | 195 08 915 A | 9/1996 |
| EP | 0 203 704 A | 12/1986 |
| EP | 0 524 821 A | 1/1993 |
| EP | 0 537 724 A | 4/1993 |
| GB | 1 589 154 A | 5/1981 |

OTHER PUBLICATIONS

International Search Report for PCT/FR01/01966.

* cited by examiner

Primary Examiner—Jack Lavinder
Assistant Examiner—Thomas J. Williams
(74) Attorney, Agent, or Firm—Heslin Rothenberg Farley & Mesiti P.C.

(57) ABSTRACT

A motor vehicle braking device includes a piston connected to the hydraulic braking circuit and connected to at least one damping element of the rear wheel or wheels, to measure the load exerted on the rear wheel or wheels. The device also includes a valve able to decrease the pressure at the calipers of the front wheel or wheels and able to supply the necessary load to the rear wheel or wheels of the vehicle to prevent any unwanted lifting of said rear wheel or wheels in the event of heavy breaking.

6 Claims, 3 Drawing Sheets

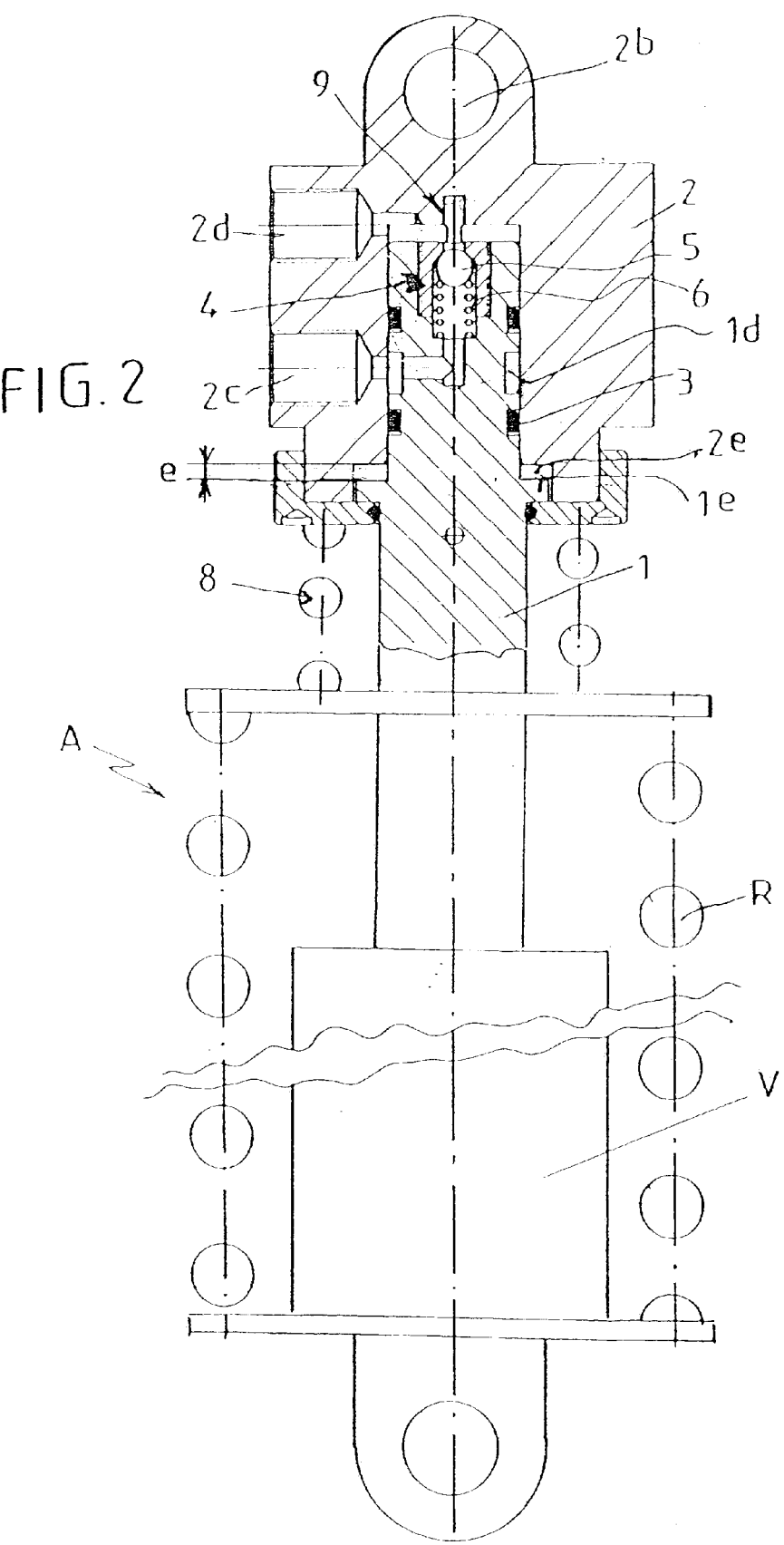

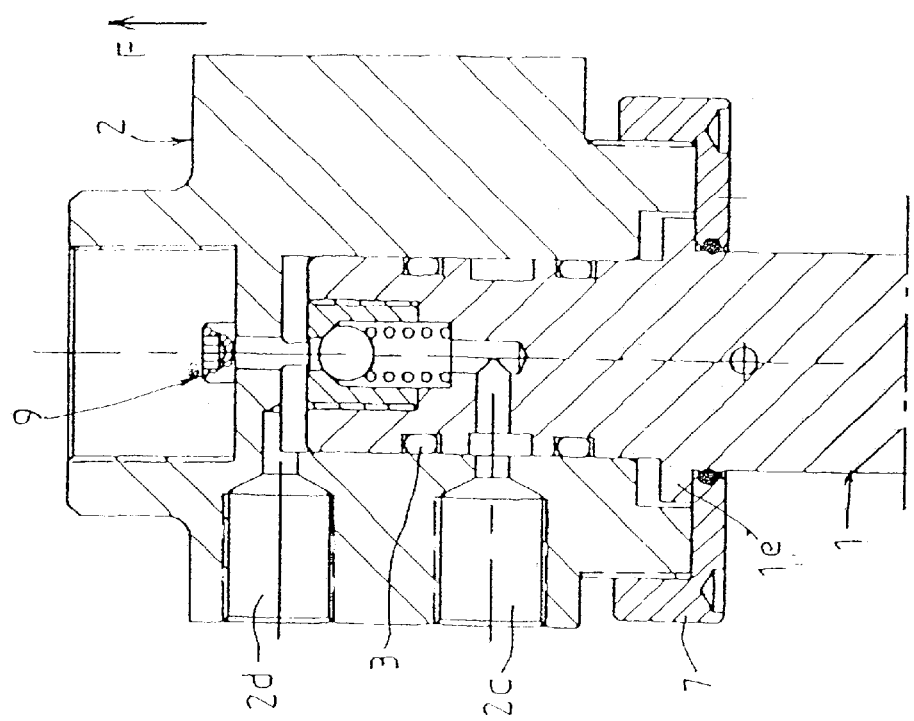
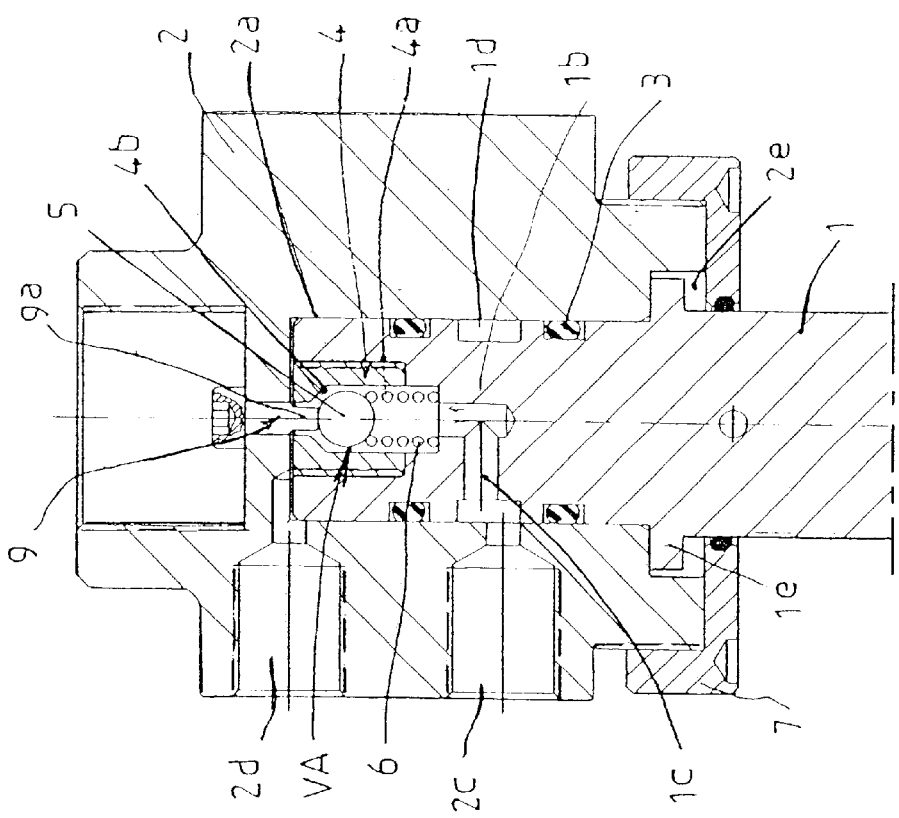

MOTOR VEHICLE BRAKING DEVICE

CROSS REFERENCE TO RELATED APPLICATIONS

This application claims priority from French patent application 00.08641, filed on Jun. 29, 2000, and International Application No. PCT/FR01/01966, filed on Jun. 22, 2001, and published in French on Jan. 3, 2001 as WO 02/00483 A1, the entire disclosures of which are incorporated herein by reference.

The invention is related to the technical field of braking devices for all types of vehicles, particularly motor cars, motorbikes, etc.

Essentially, a braking device, regardless of its type, comprises a master cylinder connected hydraulically to calipers mounted at the members that brake the wheels of the vehicle, particularly disks carried by the hubs. The calipers accommodate pistons to act, under a pressure force resulting from force exerted on an actuating member that can be operated by hand or using the foot depending on the type of vehicle considered, on pads collaborating with the disks.

The purpose of the braking action is to decelerate the vehicle, possibly then bringing the latter to a complete standstill. The effect of this braking action is to cause mass to be transferred forward, thus altering the attitude of the vehicle which has a tendency to dive down at the front, consequently unloading the rear axial assembly in the case of a car, or the rear wheel in the case of a motorbike. Obviously, the risk of toppling toward the front of the vehicle during a braking action is far more serious and occurs far more frequently in the case of a two-wheeled vehicle, such as motorbikes for example.

Reference is made to FIG. 1 which shows and explains this toppling-forward phenomenon in the case of a motorbike. In this figure, $\alpha$ is the angle formed by the horizontal and the straight line connecting the point of contact of the front wheel and the center of gravity of the rider and of the bike. If P is the acceleration due to gravity directed vertically downward and D is the deceleration due to braking then the limit of toppling toward the front of the vehicle is reached when the deceleration is greater than or equal to the ratio of the acceleration P to the tangent of the angle $\alpha$. The limit of deceleration is determined by the adhesion of the tire to the road. Let this limit be known as $\mu$. By way of entirely nonlimiting indication, a maximum $\mu$ value of 1.5 is commonly found in the dry and a $\mu$ value of 1 in the wet. For example, in the case of a sports bike, of the type illustrated in FIG. 1, the angle $\alpha$ is close to 45°, it being possible for the bike to topple forward, if the maximum limit of adhesion is greater than 1 on horizontal ground. If the bike is traveling downhill, the toppling may occur for a $\mu$ value greater than 0.9.

The result therefore is that the risk of toppling forward under braking is particularly present, except in the case of unsure adhesion, and this represents a significant danger. Indeed, with the rear wheel no longer touching the ground, the vehicle will not longer be guided or controllable. In addition, particularly in the case of a motorbike, in which the position is unstable, if the rider does not have the reflex action of instantly releasing the brakes, the machine will flip over completely.

It is also found that the various systems proposed for preventing the wheels, particularly the front wheels, from locking in the event of excessive braking, remain inoperative once the $\mu$ value exceeds 0.8 to 1, for the reason that braking will result in the vehicle toppling forward, inevitably leading to an accident. More generally, any vehicle for which the tangent of the angle $\alpha$ is greater than $1/\mu$ exhibits risks of toppling under braking.

The prior art can be illustrated by the teachings of patent EP 0 524 821 which discloses a brake control system comprising means for determining that a load of adhesion to the ground of the rear wheel is lower than or equal to a predetermined value of the deceleration. The system comprises control means for reducing and controlling a braking force at the brake of the front wheel on the basis of the previously determined results. Such control means are intended to prevent the front wheel from locking.

Patent EP 0 537 724 relates to a method for regulating the braking force of motorbikes, its objective being to be able to detect a detachment signal signifying adhesion of the rear wheel to the ground. The implementation means essentially consist of speed sensors, rotation sensors, microprocessors, pressure modulators, switching flaps, etc. This is therefore an entirely electronic system which does not make it possible to avoid detachment of the rear wheel but which, on the contrary, detects detachment of the rear wheel in order to act on the braking system and reduce the pressure at the front brake in order to allow the rear wheel to make contact with the ground again.

Such a system therefore does not make it possible to avoid the rear wheel lifting but, at the very most, makes it possible to avoid the bike toppling forward, all this being purely theoretical because it is quite clear that the rider will have the utmost difficulty controlling the bike when the rear wheel is off the ground.

The invention has set itself the object of solving these drawbacks in a simple, reliable, effective and rational way.

The problem that the invention sets out to solve is that of avoiding any detachment of the rear wheel or wheels of any type of vehicle in the event of heavy braking when there is significant deceleration causing mass to be transferred forward and therefore causing the rear axle assembly or the rear wheel to be unloaded in a way likely to cause toppling toward the front of the vehicle. As mentioned, this issue is more sensitive in the case of a two-wheeled vehicle of the motorbike type.

To solve said problem of measuring the load exerted on the rear wheel or wheels in order to determine the limit of adhesion of this or these rear wheel or wheels beyond which the toppling-forward phenomenon may arise, there has been designed and developed a braking device which comprises means which are connected to the hydraulic braking circuit and connected to at least one damping element of the rear wheel or wheels, said means being able to measure the load exerted on the rear wheel or wheels in conjunction with means able to decrease the pressure at the calipers of the front wheel or wheels and able to supply the necessary load to the rear wheel or wheels of the vehicle to prevent any unwanted lifting of said rear wheel or wheels in the event of heavy braking.

Advantageously, the means able to measure the load exerted on the rear wheel or wheels consist of a piston mounted coaxially with respect to the damping element and able to be displaced linearly, in a limited manner, with the ability for sealed guidance in a recess of a distribution support block secured to a fixed part of the vehicle, said recess being in communication with the hydraulic braking circuit at the master cylinder and the caliper of the front wheel or wheels.

To solve said problem of limiting the braking of the front wheel or wheels of the vehicle, so as to maintain a determined load on the rear wheel or wheels, the means able to reduce the pressure consist of a valve mounted coaxially at the end of the piston in conjunction with arrangements to be controlled under the effect of the displacement of said piston with a view to regulating the hydraulic pressure particularly at the caliper of the front wheel or wheels.

Advantageously, the valve comprises a body secured to a bore formed at the end of the piston, said body having an internal recess acting as a seat for a ball subject to an elastic member, said recess being in communication with the hydraulic circuit of the master cylinder, the ball being able to collaborate with a fixed element under the effect of the displacement of the piston to move it away from its seat.

To solve said problem of connecting the deceleration to a determined load considered as normal, exerted on the rear wheel or wheels, the piston of the valve is in abutment against a fixed part of the support block, the ball being away from its seat to allow fluid from the master cylinder to pass toward the caliper of the front wheel or wheels; conversely, when said load is not considered to be sufficient, there is a relative displacement of the piston of the valve and of the block as far as another extreme position of abutment corresponding to the ball being positioned in the bottom of its seat to reduce the pressure sent to said caliper.

The fixed element collaborating with the ball consists of a screw secured to the support block and opening into the recesses and of said block and of the body of the valve.

Another problem that the invention sets out to solve is that of being able to determine the minimum load that needs to be guaranteed on the rear wheel or wheels. To this end, the support block in which the piston of the valve is mounted with the capability for linear displacement is coupled to the damping element in conjunction with means of adjusting the load exerted on the rear wheel or wheels.

Another problem that the invention sets out to solve is that of being able, if necessary, to slow the displacement of the piston. To this end, the piston of the valve is mounted inside the block with the capacity for linear displacement against a hydraulic damping means.

The invention is explained in greater detail hereinafter with the aid of the figures of the appended drawings in which:

FIG. 2 is a view of the device according to the invention mounted in combination with a damping element the embodiment of which is given by way of entirely nonlimiting indication;

FIG. 3 is a part view in section of the device at the valve in the case of sufficient pressure exerted on the rear wheel, that is to say when there is no braking or there is light braking;

FIG. 4 is a view corresponding to FIG. 3 in the case of the unloading of the rear wheel corresponding to heavy braking;

Figure 1:
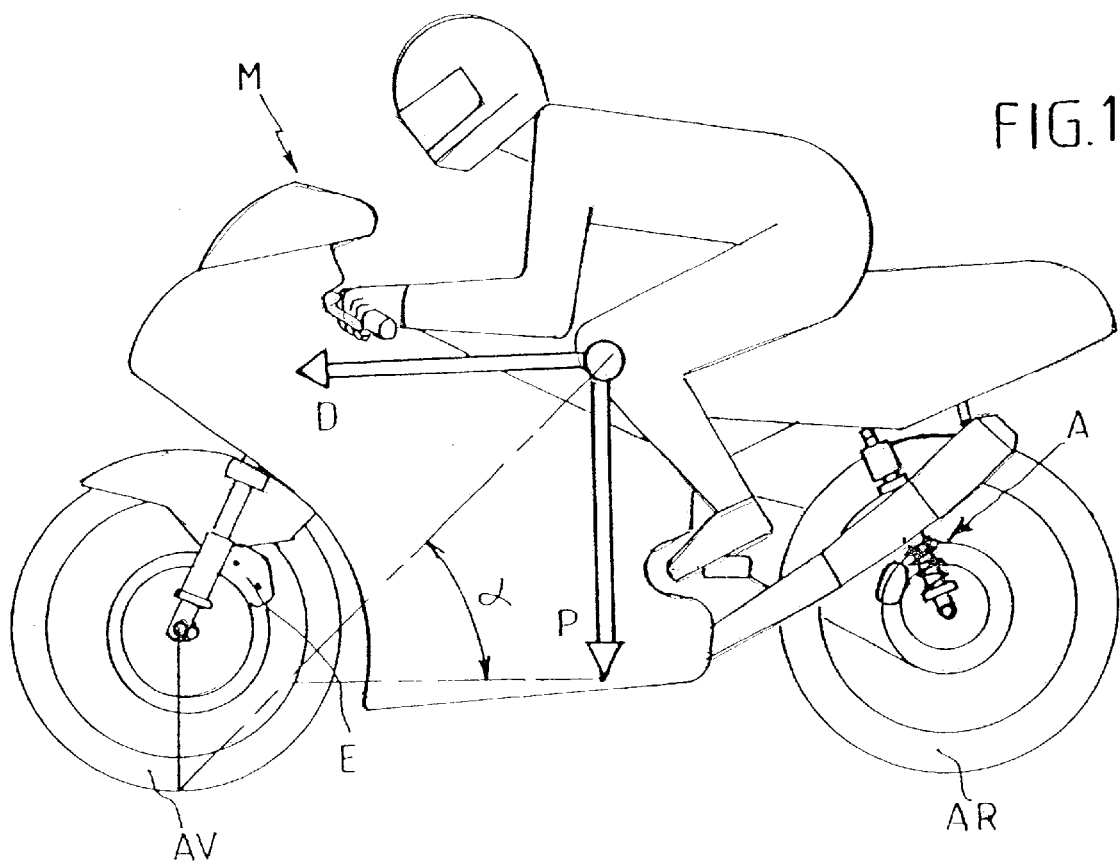
FIG. 1 is a view of schematic nature showing, in the case of a motorbike, the elements likely to cause it to topple forward in the event of heavy braking.
Figure 5:
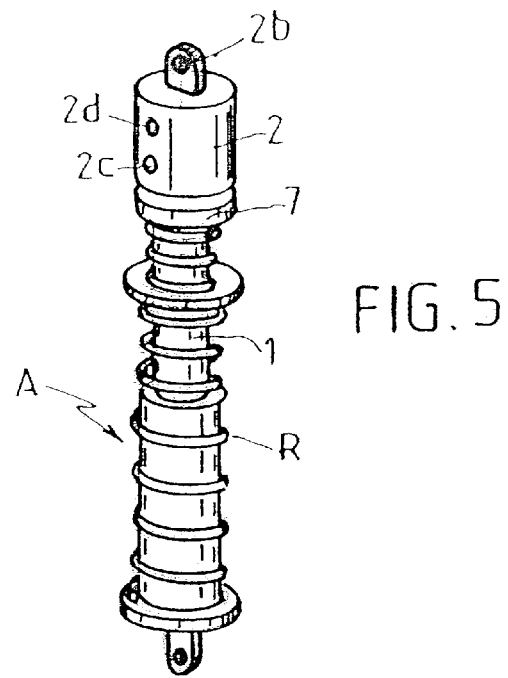
FIG. 5 is a perspective view showing the incorporation of the device into a damping element particularly for a motorbike.

The figures of the drawings show the application of the braking device according to the invention to a motorbike. Evidently, this type of example must not be considered as limiting, given that the device can be applied to any type of vehicle.

For a better understanding of the remainder of the description, the motorbike in its entirety is denoted (M), the front wheel (AV), the rear wheel (AR), the front wheel brake caliper (E) and the rear wheel damper assembly as (A). The master cylinder is not depicted.

As mentioned, the problem that the invention sets out to solve is that of limiting the braking of the front wheel (AV) so as to maintain a determined load on the rear wheel (AR). In other words, to solve this problem, the load exerted on the rear wheel (AR) needs to be measured so as, if necessary, to determine the pressure at the caliper (E) of the front wheel (AV) needed to avoid unwanted lifting of the rear wheel (AR) in the event of heavy braking.

Advantageously, and given said problem that is to be solved, the means of the braking device according to the invention are connected to the hydraulic circuit and connected to the damping element (A) of the rear wheel (AR).

In the entirely nonlimiting example illustrated, the damping element (A) essentially consists of a ram (V) combined with a spring (R).

In the embodiment illustrated, a valve (VA) is fixed to the head of the combination of the damping element at its region of attachment to a fixed part of the bike (M), so as to receive all the load on the rear wheel (AR) independently of the settings of the damper as such. To this end, a piston (1) is mounted, with capacity for guided and sealed linear displacement, in a recess (2a) of a support block (2) secured at (2b) to a fixed part of the bike.

Advantageously but without implying any limitation, the piston (1) directly consists of the rod of the damper ram (V).

The recess (2a) of the support block (2) is in communication with emerging transverse orifices (2c) and (2d). The orifice (2c) exhibits any type of arrangement for coupling with the hydraulic circuit of the master cylinder, while the orifice (2d) exhibits any type of arrangement for coupling with the hydraulic circuit of the brake caliper (E) of the front wheel (AV). The piston (1) is sealed by seals (3). The stroke for the displacement of the piston (1) in the recess (2a) of the support block (2) is limited to a value (e).

According to one important feature of the invention, the head of the piston (1) which head is situated in the relatively blind end of the recess (2a) of the support block (2) exhibits the valve denoted in its entirety as (VA). This valve comprises a body (4) secured to a bore (1a) formed in the end of the piston (1). The body (4) exhibits an internal recess (4a) acting as a seat (4b) for a ball (5) subject to an elastic member of the spring type (6). The recess (4a) is in communication with the master cylinder hydraulic circuit. To this end, the relatively blind end of the recess (4a) communicates coaxially by two orifices (1b) and (1c) in communication with an external annular groove (1d) of the piston (1). The annular groove (1d) is always in communication, regardless of the position of the piston (1), with the orifice (2d) for connection with the master cylinder.

The relatively blind end of the recess (2a) accommodating the piston (1) is in communication with the orifice (2d) for connection with the front wheel brake caliper hydraulic circuit. The ball (5) is able to collaborate with a fixed element (9) under the effect of displacement of the piston (1), to move it off its seat (4b) as will be mentioned in the remainder of the description. The fixed element (9) may consist of a screw secured to the support block (2) and opening into the recess (2a) of said block (2) and into the recess (4a) of the body (4) of the valve (VA).

Reference is made to FIGS. 3 and 4 which show the principle of operation of the braking device according to the invention.

FIG. 3 depicts the braking device under the effect of a load considered as normal at the rear wheel. This is the case, for example, if the bike is not braking or is braking with a deceleration lower than that likely to cause sufficient lightening of the rear wheel. In this case, the braking device operates as if the valve were not there. What happens is that in this position, the piston (1) of the valve is in abutment, via a flange (1e) in the relatively blind end of a cavity (2e) of the support block (2). The ball (5) is in abutment against the shank (9a) of the screw (9) and is away from its seat (4b), compressing the spring (6).

The brake fluid from the master cylinder normally passes through the various orifices to be conveyed to the recess (4a) of the body (4) of the valve, at the branch (2d). Note that, in this position, the head of the piston is not in abutment in the relatively blind end of the recess (2a) and leaves enough space for the brake fluid to pass.

FIG. 4 shows the operation of the device in the case of heavy braking. Deceleration causes lightening of the rear wheel (AR) and accordingly, causes a relative displacement of the piston of the valve (1) with respect to the support block (2) which tends to be raised upward (arrow F). The piston (1) of the valve finds itself in another extreme position of abutment via its flange (1e) on a ring (7). In this position of abutment, the ball (5), under the effect of the relaxation of the spring (6), finds itself bearing against the relatively blind end of the seat (4b) of the body (4) of the valve, thus blocking off the passage for brake fluid from the master cylinder.

The pressure at the outlet from the master cylinder does not influence the deceleration. The piston (1) of the valve therefore acts like the master cylinder. Under the effect of the relative displacement of the piston (1) of the valve and of the support block (2), the volume of liquid in the relatively blind end of the bore of the support block (2) increases and this causes the pressure in the front brake caliper to drop until the desired load on the rear wheel is obtained. If this load increases, there will be a displacement of the piston (1) of the valve in the opposite direction, accordingly increasing the pressure at the brake caliper. The deceleration is therefore indeed connected to the determined load on the rear wheel (AR).

In this position, the rider can release the brakes, and the liquid from the caliper (E) can pass through the orifice blocked off by the ball.

As shown by the figures of the drawings, particularly by FIG. 2, the support block (2) accommodating the piston (1) of the valve may be connected to the damping element (A) by a spring (8) the adjusting of the preload of which makes it possible to choose the minimum load to be guaranteed on the rear wheel.

Likewise, it is possible to create hydraulic damping in the operation of the valve so as to slow the displacement of the piston (1). More specifically, this hydraulic damping can be carried out in the circular cavity (2e) of the support block (2) in which the flange (1e) of the piston (1) is mounted with capacity for displacement.

The advantages are clearly apparent from the description, and the following are particularly emphasized and recalled:
  the device makes it possible to improve safety by avoiding any risk of the bike flipping during braking, the rear wheel remaining adhered to the ground, so that the driver can employ the brake lever to the maximum;
  the device makes it possible to exploit the full braking capacity of the vehicle while at the same time controlling the minimum load on the rear wheel throughout the whole period of braking thus significantly shortening stopping distances;
  the device makes it possible to get around variations in effectiveness of a conventional braking system, namely: variation in the coefficient of friction between the pads and the disks according to the conditions of use and the temperature; these provisions prove to be particularly beneficial for carbon/carbon brakes where the coefficient of friction can vary considerably, doubling between the start and the end of braking;
  the compatibility of the device with an antilock system which can be connected between the valve and the brake caliper.

As already mentioned, the embodiment described and illustrated is considered to be particularly advantageous but must not be considered to imply any limitation. The invention also covers all the technical means which may be considered equivalent, that is to say may be considered to perform the same functions, in spite of being embodied differently.

Thus, it is possible to use a force sensor positioned at one end of the damper to send a signal to the wheel antilock system with which the vehicle is equipped, so that said system reduces the pressure in the circuit as it does in the case of the locking of the wheels being detected.

What is claimed is:

1. A vehicle braking device comprising a master cylinder connected hydraulically to one or more calipers mounted at one or more members that brake one or more wheels of a vehicle, said one or more calipers accommodating one or more pistons to act, under a pressure force, on part of said members, said device further comprising:

a piston which is connected to an hydraulic braking circuit and connected to at least one damping element of a rear wheel or wheels;

said piston being able to measure load exerted on the rear wheel or wheels in conjunction with a valve able to decrease pressure at the calipers of a front wheel or wheels and able to supply a necessary load to the rear wheel or wheels of the vehicle to prevent any unwanted lifting of said rear wheel or wheels in the event of heavy braking;

the piston is mounted coaxially with respect to the at least one damping element and is able to be displaced linearly, in a limited manner, with the ability for sealed guidance in a recess of a support block secured to a fixed part of the vehicle, said recess being in communication with the hydraulic braking circuit at the master cylinder and the calipers of the front wheel or wheels; and the valve is mounted coaxially at an end of the piston in conjunction with means to be controlled under the effect of displacement of said piston for regulating hydraulic pressure particularly at the calipers of the front wheel or wheels.

2. The device as claimed in claim 1, wherein the valve comprises a body secured to a bore formed at the end of the piston, said body having an internal recess acting as a seat for a ball subject to an elastic member, said recess being in communication with the hydraulic circuit of the master cylinder, the ball being able to collaborate with a fixed element under the effect of the displacement of the piston to move the ball away from the seat.

3. The device as claimed in claim 2 wherein, under the effect of a load considered as normal, exerted on the rear wheel or wheels, the piston is in abutment against a fixed part of the support block, the ball being away from the seat to allow fluid from the master cylinder to pass toward the calipers of the front wheel or wheels; conversely, when said load is not considered to be sufficient, there is a relative displacement of the piston and of the block as far as another extreme position of abutment corresponding to the ball being positioned in a bottom of the seat to reduce the pressure sent to said calipers.

4. The device as claimed in claim 3, wherein the fixed element collaborating with the ball comprises a screw secured to the support block and opening into recesses of said block and of the body of the valve.

5. The device as claimed in claim 1, wherein the support block is coupled to the damping element in conjunction with means for adjusting the load exerted on the rear wheel or wheels.

6. The device as claimed in claim 1, wherein the piston is mounted inside the support block with a capacity for linear displacement against a hydraulic damping means.

* * * * *

UNITED STATES PATENT AND TRADEMARK OFFICE
CERTIFICATE OF CORRECTION

PATENT NO. : 6,672,437 B2
DATED : January 6, 2004
INVENTOR(S) : Beringer

It is certified that error appears in the above-identified patent and that said Letters Patent is hereby corrected as shown below:

<u>Column 8,</u>
Line 1, delete the number "3" and insert -- 2 --

Signed and Sealed this

Ninth Day of March, 2004

JON W. DUDAS
*Acting Director of the United States Patent and Trademark Office*